(12) United States Patent
Park et al.

(10) Patent No.: US 11,470,660 B2
(45) Date of Patent: Oct. 11, 2022

(54) APPARATUS AND METHOD FOR TRAFFIC PATH CONTROL BETWEEN LTE AND NR ACCESS IN 5G NETWORK ENVIRONMENT

(71) Applicant: Samsung Electronics Co., Ltd., Suwon-si (KR)

(72) Inventors: Jungshin Park, Suwon-si (KR); Beomsik Bae, Suwon-si (KR); Jicheol Lee, Suwon-si (KR); Kisuk Kweon, Suwon-si (KR); Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/045,968

(22) PCT Filed: Apr. 9, 2019

(86) PCT No.: PCT/KR2019/004210
§ 371 (c)(1),
(2) Date: Oct. 7, 2020

(87) PCT Pub. No.: WO2019/199022
PCT Pub. Date: Oct. 17, 2019

(65) Prior Publication Data
US 2021/0289569 A1 Sep. 16, 2021

(30) Foreign Application Priority Data
Apr. 9, 2018 (KR) .................. 10-2018-0041213

(51) Int. Cl.
*H04W 76/12* (2018.01)
*H04W 28/08* (2009.01)
(Continued)

(52) U.S. Cl.
CPC ....... *H04W 76/12* (2018.02); *H04W 28/0808* (2020.05); *H04W 28/24* (2013.01); *H04W 68/005* (2013.01)

(58) Field of Classification Search
CPC . H04W 76/12; H04W 28/0808; H04W 28/24; H04W 68/005; H04W 76/18;
(Continued)

(56) References Cited

U.S. PATENT DOCUMENTS

2016/0073450 A1* 3/2016 Vikberg .......... H04W 36/00837
370/329
2017/0111822 A1 4/2017 Jung et al.
(Continued)

FOREIGN PATENT DOCUMENTS

KR 20200049760 A * 5/2020
WO 2017142362 A1 8/2017

OTHER PUBLICATIONS

Interdigital Inc., "Network-controlled Traffic Steering for Multi-access PDU Session," S2-182017 (revision of 2-17x0009, SA WG2 Temporary Document, SA WG2 Meeting #126, Montreal, Canada, Feb. 26-Mar. 2, 2018, pages. (Year: 2018).*
(Continued)

*Primary Examiner* — Peter P Chau

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

15 Claims, 14 Drawing Sheets

(51) Int. Cl.
*H04W 28/24* (2009.01)
*H04W 68/00* (2009.01)

(58) Field of Classification Search
CPC ..... H04W 48/18; H04W 76/16; H04W 88/06; H04W 28/0247
See application file for complete search history.

(56) References Cited

U.S. PATENT DOCUMENTS

| | | |
|---|---|---|
| 2017/0303259 A1 | 10/2017 | Lee et al. |
| 2018/0084458 A1 | 3/2018 | Koskinen et al. |
| 2018/0092000 A1 | 3/2018 | Kim et al. |
| 2018/0092024 A1 | 3/2018 | Ardeli et al. |
| 2018/0092147 A1 | 3/2018 | Pelletier et al. |
| 2019/0037636 A1 | 1/2019 | Kim et al. |
| 2020/0178196 A1* | 6/2020 | Wang ............ H04W 60/005 |

OTHER PUBLICATIONS

InterDigital Inc., "UE Requested Multi-access PDU Session Establishment", S2-180449, SA WG2 Temporary Document, SA WG2 Meeting #125, Gothenburg, Sweden, Jan. 22-Jan. 26, 2018, 4 pages. (Year: 2018).*

LE Electronics, "Clarification on handover applicability between 3GPP and non-3GPP accesses", S2-180520, SA WG2 Meeting #125, Gothenburg, Sweden, Jan. 22-Jan. 26, 2018, 9 pages. (Year: 2018).*

InterDigital Inc., "UE Requested Multi-access PDU Session Establishment", S2-182015, SA WG2 Temporary Document, SA WG2 Meeting #126, Montreal, Canada, Feb. 26-Mar. 2, 2018, 4 pages. (Year: 2018).*

International Search Report and Written Opinion of the International Searching Authority in connection with International Application No. PCT/KR2019/004210 dated Aug. 8, 2019, 9 pages.

Huawei et al., "Solution 3: Multi-access PDU Session Establishment with NCP," S2-183038 (e-mail revision 3 of S52-182886), SA WG2 Temporary Document, SA WG2 Meeting #126, Montreal, Canada, Feb. 26-Mar. 2, 2018, 7 pages.

Interdigital Inc., "Network-controlled Traffic Steering for Multi-access PDU Session," S2-182017 (revision of S2-17xxxx), SA WG2 Temporary Document, SAWG2 Meeting #126, Montreal, Canada, Feb. 26-Mar. 2, 2018, 4 pages.

LG Electronics, "ATSSS Solution—Multi-Access PDU Session Establishment," S2-182043 (revision of S2-18xxxx), SA WG2 Temporary Document, SA WG2 Meeting #126, Montreal, Canada, Feb. 22-Mar. 2, 2018, 3 pages.

* cited by examiner

APPARATUS AND METHOD FOR TRAFFIC PATH CONTROL BETWEEN LTE AND NR ACCESS IN 5G NETWORK ENVIRONMENT

CROSS-REFERENCE TO RELATED APPLICATIONS

This application is a 371 National Stage of International Application No. PCT/KR2019/004210, filed Apr. 9, 2019, which claims priority to Korean Patent Application No. 10-2018-0041213, filed Apr. 9, 2018, the disclosures of which are herein incorporated by reference in their entirety.

BACKGROUND

1. Field

The disclosure relates to an apparatus for designating and controlling access for transmitting data for respective applications to a UE and network equipment using a $5^{th}$-generation (5G) mobile communication system, and a method of operating the same.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In a 5G communication system, implementation in a mmWave band (for example, 60 GHz) is considered in order to satisfy the requirement for a high data transmission rate. However, a radio propagation distance is significantly reduced due to an increase in the propagation path loss in the mmWave band. In the 5G communication system, technologies such as beamforming, massive MIMO, full dimensional MIMO (FD-MIMO), array antenna, analog beam-forming, and large scale antenna are being discussed as means to solve the problem.

Meanwhile, while there is no need to control a path as a UE accesses a single BS within a single system in a general communication system, additional communication technology for controlling a user traffic path is needed as the UE communicates simultaneously through an LTE BS (eNB) and an NR BS (gNB) in a 5G network, and thus the disclosure proposes a scheme for solving the problem.

SUMMARY

Embodiments provide equipment and a method for controlling a data transmission path between LTE and NR access according to a request from or a service type used by a UE in a 5G network supporting dual connectivity. Through the proposed method, the network may select LTE or NR access according to the service type used by the UE and designate and control access to be used by the UE.

In accordance with an aspect of the disclosure, a method of establishing a connection by a terminal in a wireless communication system is provided. The method includes: transmitting a session establishment request message to a base station in order to transmit the session establishment request message, including first access information preferred by an application executed by the terminal and available access information of the terminal, to a session management function (SMF); and setting a radio link with the base station, based on second access information selected for data transmission of the application by the SMF. The second access information may be selected based on subscriber information provided from a policy control function (PCF), the first access information, and the available access information.

The session establishment request message may further include at least one piece of information related to a quality of service (QoS) requested by the terminal and identifier information of the application.

The method may further include, in case that access information that can be used by the terminal is changed, transmitting a first message including the available access information of the terminal and downlink statistic information to the SMF; and in case that traffic switching is determined by the SMF, based on the first message, setting a radio link with the base station, based on third access information selected for data transmission of the application by the SMF.

The method may further include, in case that access information that can be used by the terminal is changed, transmitting a second message including the available access information of the terminal and downlink statistic information to an access and mobility function (AMF); and in case that the available access information is transmitted from the AMF to the SMF and traffic switching is determined by the SMF, based on the available access information, setting a radio link with the base station, based on third access information selected for data transmission of the application by the SMF.

In accordance with another aspect of the disclosure, a method of establishing a connection by a session management function (SMF) in a wireless communication system is provided. The method includes: in case that a session establishment request message including first access information preferred by an application executed by a terminal and available access information of the terminal is transmitted from the terminal to a base station, receiving the session establishment request message from the base station; determining second access information for data transmission of the application, based on subscriber information received from a policy control function (PCF), the first access information, and the available access information; and transmitting the second access information to an access and mobility function (AMF).

The session establishment request message may further include at least one piece of information related to a quality of service (QoS) requested by the terminal and identifier information of the application.

The method may further include, in case that access information that can be used by the terminal is changed, receiving a first message including the available access information of the terminal and downlink statistic information from the terminal; in case that traffic switching is determined based on the first message, determining third access information for data transmission of the application; and transmitting the third access information to the AMF.

The method may further include in case that access information that can be used by the terminal is changed, receiving the available access information of the terminal from the AMF; and in case that traffic switching is determined based on the available access information, determining third access information for data transmission of the application; and transmitting the third access information to the AMF.

In accordance with another aspect of the disclosure, a terminal establishing a connection in a wireless communication system is provided. The terminal includes: a transceiver; and a controller configured to control the transceiver through a connection to the transceiver, transmit a session establishment request message to a base station to transmit the session establishment request message including first access information preferred by an application executed by the terminal and available access information of the terminal to a session management function (SMF), and set a radio link with the base station, based on second access information selected for data transmission of the application by the SMF. The second access information may be selected based on subscriber information provided from a policy control function (PCF), the first access information, and the available access information.

In accordance with another aspect of the disclosure, a session management function (SMF) establishing a connection in a wireless communication system is provided. The SMF includes: a transceiver; and a controller configured to control the transceiver through a connection to the transceiver, perform control to receive the session establishment request message from a base station in case that the session establishment request message including first access information preferred by an application executed by a terminal and available access information of the terminal is transmitted from the terminal to the base station, determine second access information for data transmission of the application, based on subscriber information received from a policy control function (PCF), the first access information, and the available access information, and transmit the second access information to an access and mobility function (AMF).

According to various embodiments, it is possible to efficiently select LTE and NR accesses according to an application that a UE desires to use, a service type, a service provider policy, and a network condition and allow the UE to use the LTE and NR access in a 5G network environment supporting two types of access, such as LTE and NR.

Further, it is possible to change a data transmission path for each application used by the UE without any change in implementation of a base station through simple addition of a function of new equipment such as an SMF and a UPF.

In addition, it is possible to control the use of a network separately for each subscriber policy (e.g. a calling plan or a user class) of a service provider when types of LTE and NR access are simultaneously used.

DETAILED DESCRIPTION

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

Currently, the standardization of a 5G communication standard is being actively conducted, and initiation of a 5G service before and after 2020 is predicted. A new 5G network for providing the 5G service supports a dual-connectivity function to actively reuse an LTE BS from the initial introduction step and it is predicted that service will be provided to a mobile communication UE using a newly installed NR BS and an LTE BS simultaneously. Particularly, in order to solve a service disconnection problem due to limited service coverage of the NR BS in an initial 5G step, a function for providing seamless service through a link with the LTE BS, having relatively larger coverage than the NR BS should be necessarily considered.

The NR BS in a mmW frequency band, considered as a 5G communication band, is suitable for a broadband and high-speed service, but is limited with regard to UE mobility management due to a small cell radius and a high path loss, and thus there is demand for a technology using dual connectivity to use the LTE BS in order to supplement the NR BS.

The overall operation and procedures of the UE and the 5G network for providing seamless service to the UE when the UE moves out of a service area (coverage) of the NR BS and moves to an area in which only LTE BS service is possible, or when the UE moves to an area in which only NR BS service is possible from an area in which only LTE BS service is possible, and thus the UE desires to change access to be used, are being defined.

Meanwhile, if the NR BS has considerable coverage due to the gradual supply thereof, the frequency that one UE simultaneously accesses the NR BS and the LTE BS to use the same may increase in which case a technology for efficiently using NR and LTE access is needed.

The disclosure provides a method of configuring and controlling a data transmission path using LTE and NR access for each user application in a 5G network environment supporting the simultaneous use of LTE and NR access by one UE, and the following description is made on the basis of a dual connectivity model in which one of the LTE and NR BSs is a master node for convenience of description.

The dual connectivity model may be divided into a model in which one of the LTE and NR BSs serves as a master node and the other one serves as a secondary node, and a model in which both the LTE and NR BSs serve as the master node.

Figure 1:
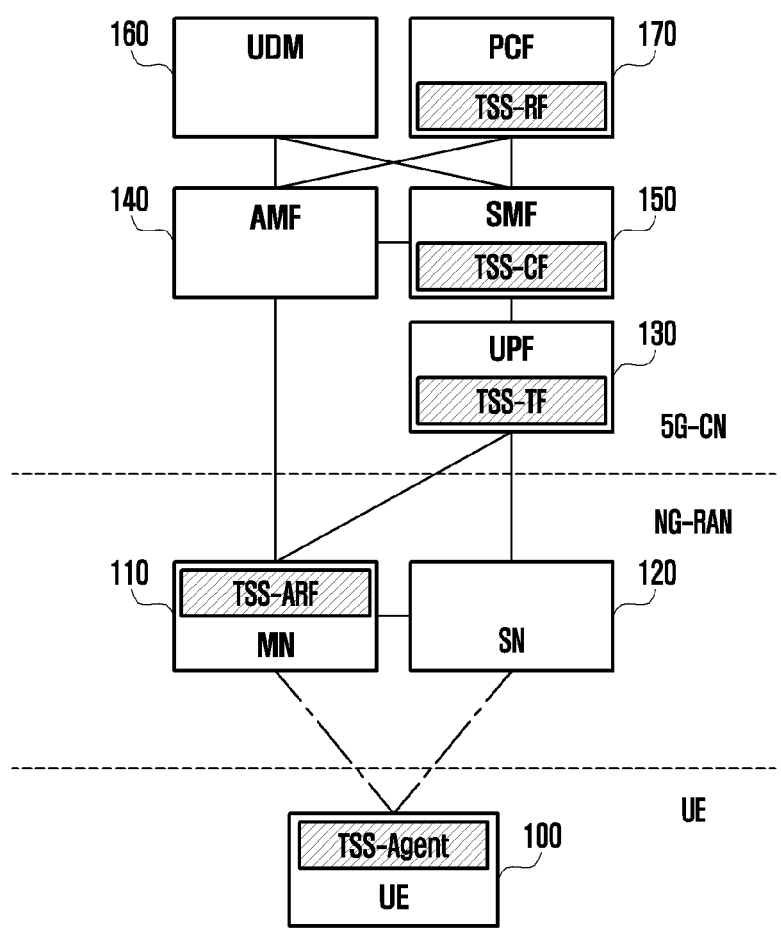
FIG. 1 illustrates a network structure supporting dual connectivity of LTE and NR according to an embodiment.

FIG. 1 illustrates a network structure supporting dual connectivity of LTE and NR according to an embodiment.

Referring to FIG. 1, a user equipment (UE) 100 may establish dual LTE and NR connections (dual connectivity) to a master node (MN) 110 which is one of LTE and NR BSs and a secondary node (SN) 120 which is the other one thereof. At this time, the UE 100 may perform a traffic steering/switching (TSS)-agent function, and the MN 110 may perform a traffic steering/switching (TSS)-agent rule function (ARF).

The UE 100 performing the TSS-agent function may perform internal routing of traffic of the UE on the basis of received rule information, network signaling, or report statistic information through NAS. The MN 110 performing the TSS-ARF may relay traffic steering/switching between the UE 100 and a 5G core network (5G-CN).

The 5G core network (5G-CN) may include a user plane function (UPF) 130, an access and mobility function (AMF) 140, a session management function (SMF) 150, a user data management (UDM) 160, and a policy control function (PCF) 170.

The UPF 130 may perform traffic steering/switching (TSS)-TF and may transmit data path status information to the SMF 150.

The AMF 140 may perform a mobility management function within the network, and the SMF 150 may perform a session management function within the network and a TSS control function (CF). The SMF 150 performing the TSS CF may determine/allow steering/switching of specific traffic on the basis of received rule information, radio availability, and load conditions.

The UDM 160 may store user subscription data and policy data, and the PCF 170 may determine session management and mobility management policies and transfer the same to the AMF 140 and the SMF 150, thereby appropriately performing mobility management, session management, and QoS management. The PCF 170 may perform a TSS-rule function (RF) and store UE subscription rule information.

FIG. 1 illustrates arrangement of necessary functions for controlling a user traffic transmission path when one of the LTE and NR BSs serves as the master node, and all signal messages between the UE and the network are transmitted via the master node. The AMF 140 performing UE mobility management and the SMF 150 performing session management in the core network cannot determine whether there is a secondary node and receive all status information through the UE or the master node.

Figure 2:
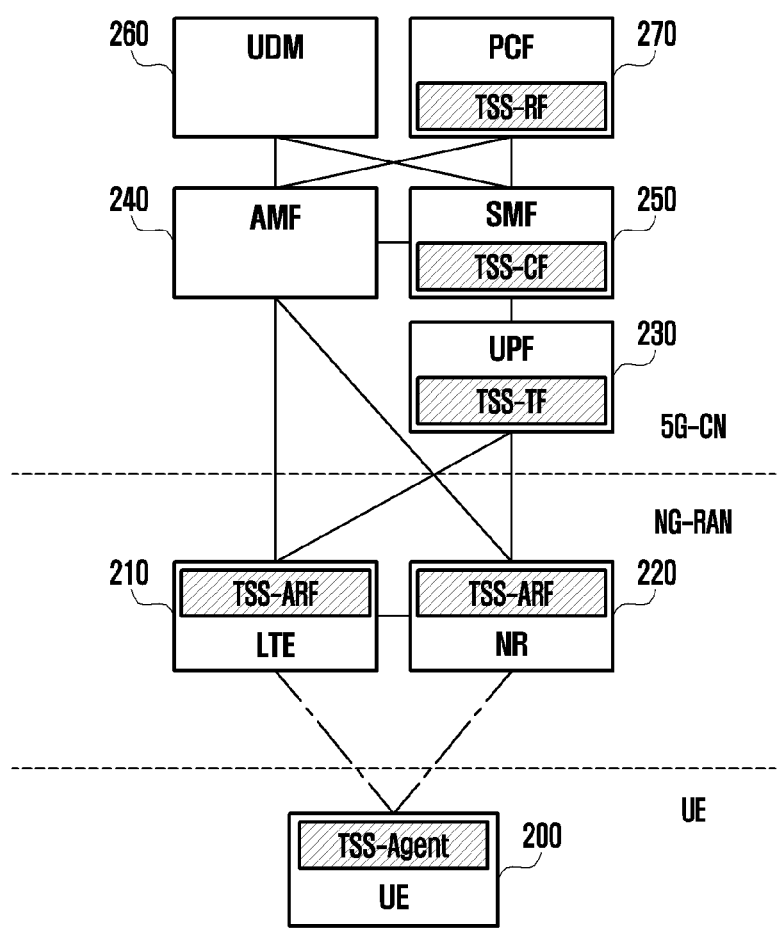
FIG. 2 illustrates a network structure in which LTE and NR BSs are independently connected to a UE at the same time according to an embodiment.

FIG. 2 illustrates a network structure in which LTE and NR BSs are independently connected to the UE according to an embodiment.

The entities 200 to 270 illustrated in FIG. 2 may perform the same functions as the entities 100 to 170 illustrated in FIG. 1. However, FIG. 2 illustrates a model in which LTE and NR BSs independently operate, and the UE 200 may transmit and receive signal messages to and from the two BSs, and the network may also separately manage UE connection states for LTE and NR, thereby directly determining whether two accesses can be used.

Referring to FIG. 2, the UE 200 may be independently connected to the LTE BS 210 and the NR BS 220. At this time, the UE 100 may perform a traffic steering/switching (TSS)-agent function, and each of the LTE BS 210 and the NR BS 220 may perform a traffic steering/switching (TSS)-agent rule function (ARF).

The method proposed by the disclosure may be applied to both simultaneous connection models proposed in FIGS. 1 and 2 and describes operation according to an embodiment on the basis of FIG. 1 merely for convenience of description.

Figure 3:
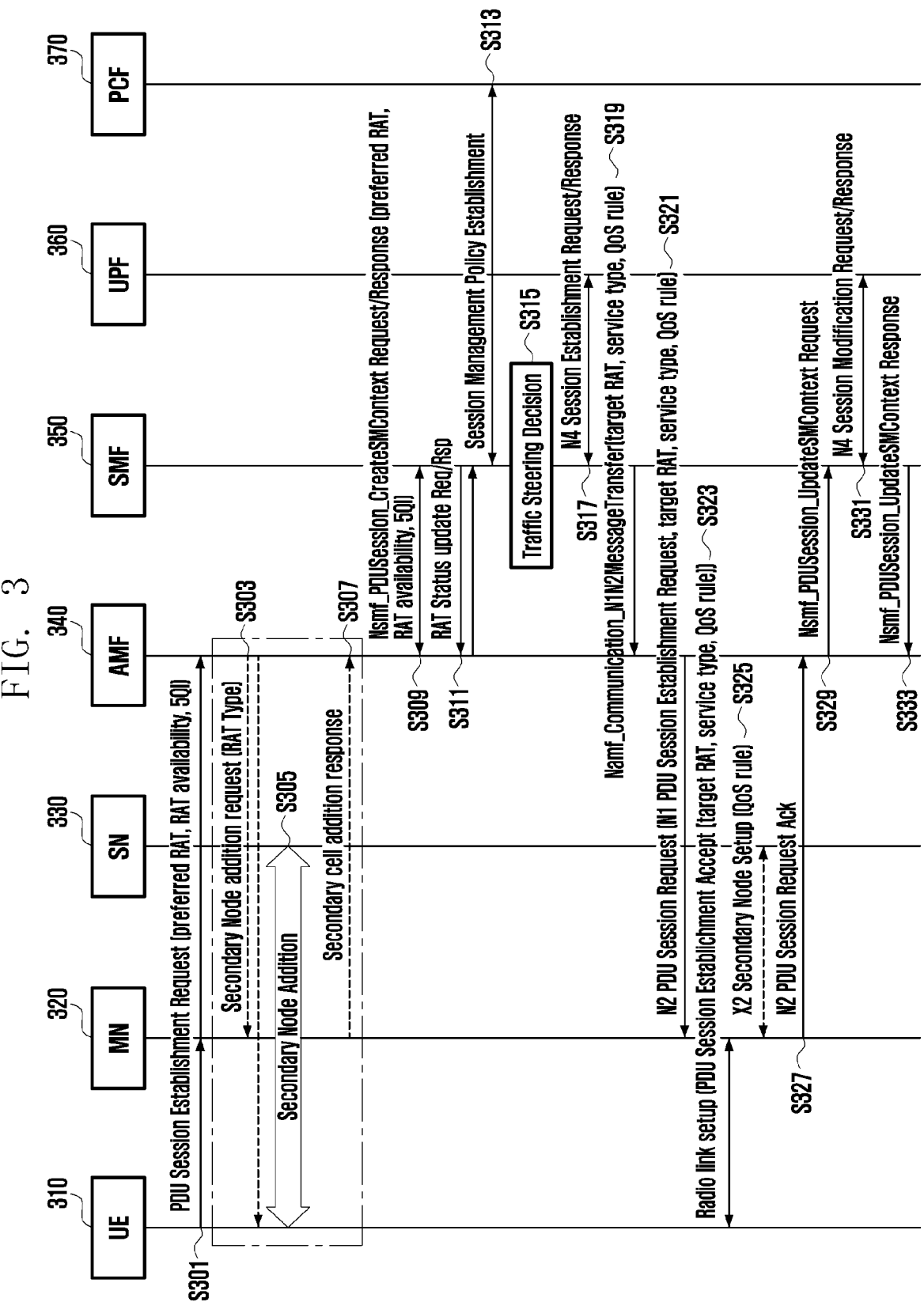
FIG. 3 is a sequence diagram illustrating an operation method by which the network determines access to be used for data transmission of a corresponding service and transmits the access to the UE when the UE makes a request for configuring a new QoS flow to a master node (MN) for a user application service according to an embodiment.

FIG. 3 is a sequence diagram illustrating an operation method by which the network determines access to be used for data transmission of a corresponding service and transmits the access to the UE when the UE makes a request for configuring a new QoS flow to a master node (MN) for a user application service according to an embodiment.

As illustrated in FIG. 3, the disclosure includes a process in which an SMF 350 performing a traffic control function (TSS-CF) identifies service (application) information requested by the user, a process of applying a reference configured in the network to an identified application identifier, a process of configuring a data transmission path using the selected access and notifying a UE 300 of the data transmission path, and a process in which the UE 300 transmits traffic through the predetermined data transmission path on the basis of the received information during a process in which the UE makes a request for modification a new session or a conventional session to a network for a user service through predetermined access in the situation in which the UE simultaneously accesses LTE and NR BSs.

Further, the following new messages and parameters are defined for operation of new functions proposed by the disclosure.

PDU Session Establishment/Modification Request (preferred RAT, RAT availability, 5QI)

in order to receive a QoS flow to be used by an application from the network according to an application request, the UE transmits a message making a request for configuring or modification a session to the SMF through the selected access Preferred RAT: preferred access information randomly determined by the UE for the corresponding application on the basis of a service provider policy configured within the UE, user preference, and UE implementation information RAT availability: refers to information indicating whether the RAT can be used for each type of access at the time point at which a request message is transmitted and may be directly included by the UE or inserted into a message that the MN transmits to the AMF, depending on implementation App ID: refers to an identifier indicating a specific application, and uses a predetermined value for each application through determination of the application by the UE or the network Target RAT: refers to access information selected by the SMF for data transmission of a user application Service type: refers to a parameter indicating whether the selected RAT must be necessarily used or whether another RAT can also be used, and has values of LTE only, NR only, LTE preferred, NR preferred, and No preference:

DL statistics: refer to downlink statistic information collected by the UE or the BS for the corresponding QoS flow and may include the following values LTE performance Index, NR performance index: LTE and NR performance evaluation indexes LTE throughput, NR throughput: LTE and NR throughput Number of UEs on LTE, Number of UEs on NR: the number of UEs accessing LTE and NR BSs Duration spent on LTE, Duration spent on NR: accumulated duration of LTE and NR access by the corresponding UE A detailed operation based on elements of the disclosure is described with reference to FIG. 3 on the basis of the above description. FIG. 3 illustrates an operation procedure for configuring a data path in response to a request for creating and modification a session from the UE, that is, an operation procedure of an example in which the UE makes a request for a session through a currently designated MN and the network configures the transmission path (LTE or NR access) to be finally used in response to the corresponding request.

Detailed operation thereof is described below with reference to FIG. 3.

(1) The UE 310 supporting dual (simultaneous) connection via LTE and NR may transmit a message making a request for a new session establishment for data transmission of a user application to a designated MN 320 (LTE or NR BS) (or making a request for a pre-established session modification—in this case, the message may be replaced with a PDU session modification request message) in S301. At this time, when there is application information that a service provider has provided to the UE, the UE 310 may insert the identifier of the corresponding application and 5QI, which is requested QoS information, into the session establishment request message and transmit the message to the network. Further, the UE may select preferred access to be used by the corresponding application with reference to the configuration information provided from the service provider and insert the preferred access into the session establishment request message. In addition, in order to easily perform an access selection process in the network, access to which the UE is currently connected may be included in a RAT availability parameter.

(2) When the AMF 340 receives a session establishment (or modification) request message from the UE 310, the AMF 340 may update the state of access available by the UE 310 by performing a secondary node addition process with the MN 320 and the UE 310 during a process of transmitting the corresponding request to the SMF 350 in S303. The UE 310, the MN 320, and the SN 330 may perform the secondary node addition operation in S305, and the MN 320 may transmit a secondary cell addition response message to the AMF 440 in S307.

(3) The AMF 340 and the SMF 350 may transmit and receive a Nsmf_PDUSession_CreateSMContext request/response in S309. The request/response may include a preferred RAT, RAT availability, and 5QI. The SMF 350 may extract access preferred by the UE (preferred RAT), available access information (RAT availability), QoS to be used (5QI), and application identifier (App ID) information from the session establishment request message of the UE 310 received through the AMF 340.

(4) When access availability information is not included or when only one type of access is included, the SMF 350 may make a request for a RAT status update to the AMF 340 in S311. The AMF 340 receiving the RAT status update in S311 inserts available access state information of the UE 310 into a response message and transmits the response message to the SMF 350. At this time, when S303 to S307 are omitted and not performed in the previous procedure, the AMF 340 may update the available access state information of the UE by performing the secondary node addition process described in S303 to 307 with the MN 320 before transmitting a RAT status update response message to the SMF 350.

(5) The SMF 350 and the PCF 370 may establish a session management policy in S313. The SMF 350 makes a request for user subscription information to the PCF 370 and receives the user subscription information in order to determine access to be used for the corresponding application by the UE 310.

(6) The SMF 350 determines final access to be used by the UE for data transmission of the corresponding application on the basis of subscriber information received from the PCF 370 (information indicating whether NR can be used, a QoS profile, and an available service type), service provider configuration information within the SMF, access preferred by the UE, available access information of the UE, network load information for each type of access, and requested application information in S315.

(7) The SMF 350 and the UPF 360 may transmit and receive an N4 session establishment request/response in S317. The SMF 350 transmits tunnel information to configure a transmission path for data transmission to the UPF 360.

(8) The SMF 350 transmits a session establishment response message to the UE and to the BS. The session establishment response message includes determined access information (target RAT), a service type, and QoS rule information. The determined access information designates an access type to be used for transmitting and receiving traffic of the corresponding application by the corresponding UE, and the service type designates whether the UE is able to use other access types in a subsidiary manner when the quality of the corresponding access type deteriorates depending on the radio state. The QoS rule designates a QoS parameter of a QoS flow allocated for transmitting and receiving traffic of the corresponding application. In S319, the SMF 350 may transmit Namf_Communication_N1N2MessageTransfer including at least one of a target RAT, a service type, and a QoS rule to the AMF 340. In S321, the AMF 340 may transmit an N2 PDU session request including at least one of an N1 PDU session establishment request, a target RAT, a service type, and a QoS rule to the MN 320.

(9) After receiving a session establishment response message from the SMF 350, the MN 320 performs a radio link setup procedure for transmitting and receiving traffic of the corresponding application with the UE 310 in S323. At this time, if the SMF 350 has not configured the designated access for the corresponding application, the MN BS 320 performs a secondary node setup process for using the corresponding access with the UE 310.

(10) When receiving a session establishment request identification (Ack) message from the UE 310, the MN BS 320 transmits the message to the SMF 350 via the AMF 340 and finishes a transmission path configuration process for the corresponding application. That is, the MN 320 and the SN 330 may setup an X2 secondary node including the QoS rule in S325, and the MN 320 may transmit an N2 PDU session request Ack to the AMF 340 in S327. Thereafter, the AMF 340 may transmit a Nsmf_PDUSession_UpdateSMContext request to the SMF 350 in S329, and the SMF 350 may transmit and receive an N4 session modification request/response to and from the UPF 360 in S331. Lastly, the SMF 350 may transmit a Nsmf_PDUSession_UpdateSMContext response to the AMF 340 in S333.

Figure 4:
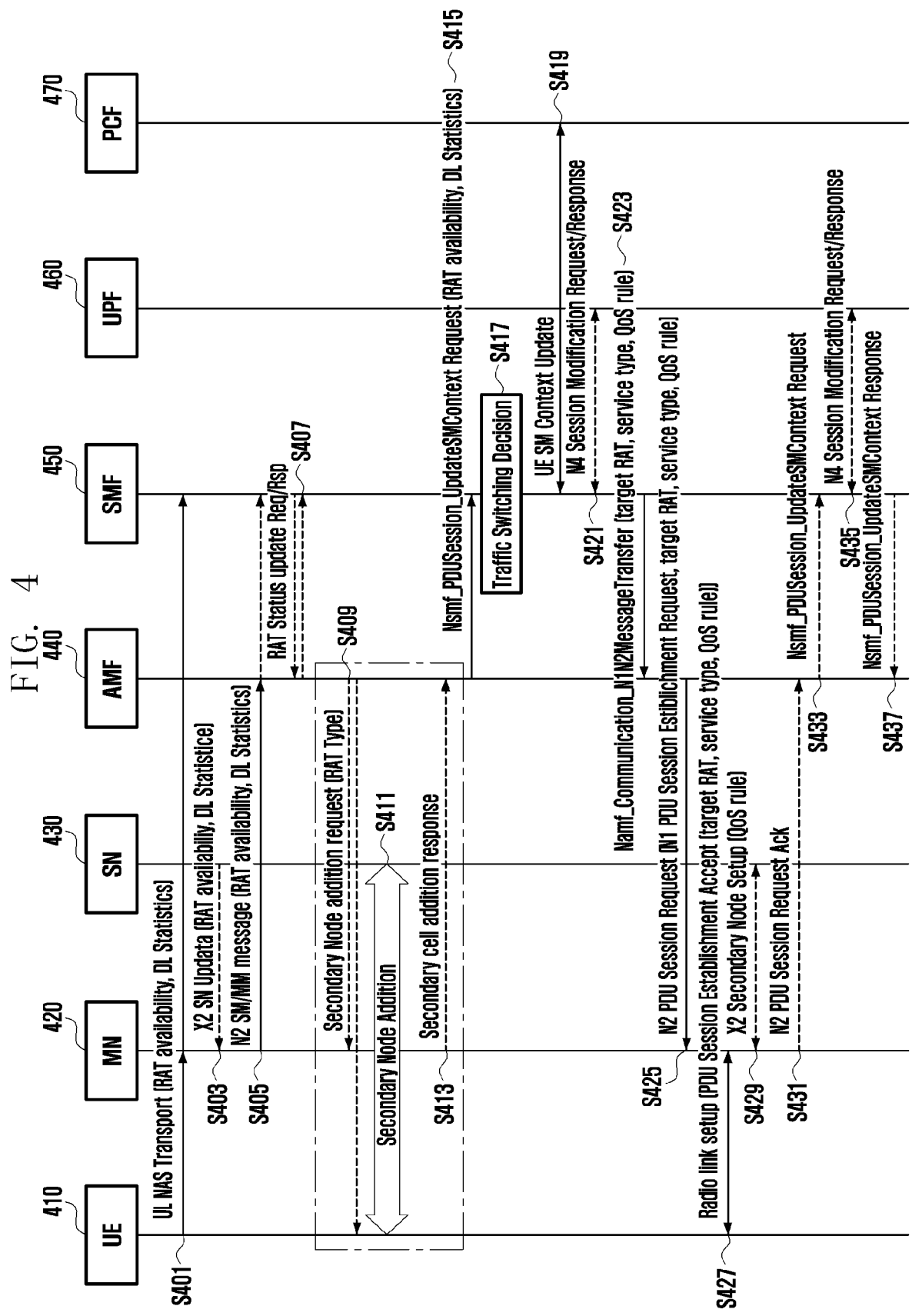
FIG. 4 is a sequence diagram illustrating an operation method of, when available access information is changed while the UE uses access designated by the network, reporting changed state information to the network and performing control to reconfigure access to be used by the UE on the basis of the reported state information according to an embodiment.

FIG. 4 is a sequence diagram illustrating an operation method of, when available access information is changed while the UE uses access designated by the network, reporting changed state information to the network and performing control to reconfigure access to be used by the UE on the basis of the reported state information according to an embodiment.

FIG. 4 illustrates an operation procedure of an example in which, when available access of the UE 410 is changed in the state in which a QoS flow for transmitting traffic of an application is configured or when transmission path configuration is performed in the state in which the UE 410 does not have the corresponding application installed thereon and thus has not transmitted application identifier information to the network during a process of initially configuring a transmission path, the network configures a change in access to be used by the UE 410 for traffic of the corresponding application.

Detailed operation thereof is described below with reference to FIG. 4.

(1) A UE 410 may transmit a UL NAS message to an SMF 450 in S401. At this time, the UE 410 may insert types of access to which the UE 410 is currently connected into the UL NAS message as a RAT availability parameter. Further, the UE 410 may insert DL statistics into the UL NAS message.

(2) An SN 430 may transmit an X2 SN update including the RAT availability parameter and DL statistics to an MN 420 in S403.

(3) The MN 420 may transmit an N2 SM/MM message including the RAT availability parameter and DL statistics to the SMF 450 via an AMF 440 in S405.

(11) The SMF 450 may make a request for a RAT status update to the AMF 440 in S407. Thereafter, the SMF 450 may receive the RAT status update from the AMF 440. The AMF may perform a secondary node addition process. The AMF 440 may transmit a secondary node addition request including a RAT type to the MN 420 and the UE 410 in S409. The UE 410, the MN 420, and the SN 430 may perform the secondary node addition operation in S411, and the MN 420 may transmit a secondary cell addition response message to the AMF 440 in S413.

(4) The AMF 440 may transmit a Nsmf_PDUSession_updateSMContextRequest including the RAT availability parameter and DL statistics to the SMF 450 in S415.

(5) When traffic switching is determined by the SMF 450 in S417, the SMF 450 and the PCF 470 may transmit and receive a UE SM context update in S419.

(6) The following processes (S421 to S437) are substantially the same as the processes (S317 to S333) described with reference to FIG. 3, and thus a description of the corresponding processes is omitted.

Figure 5:
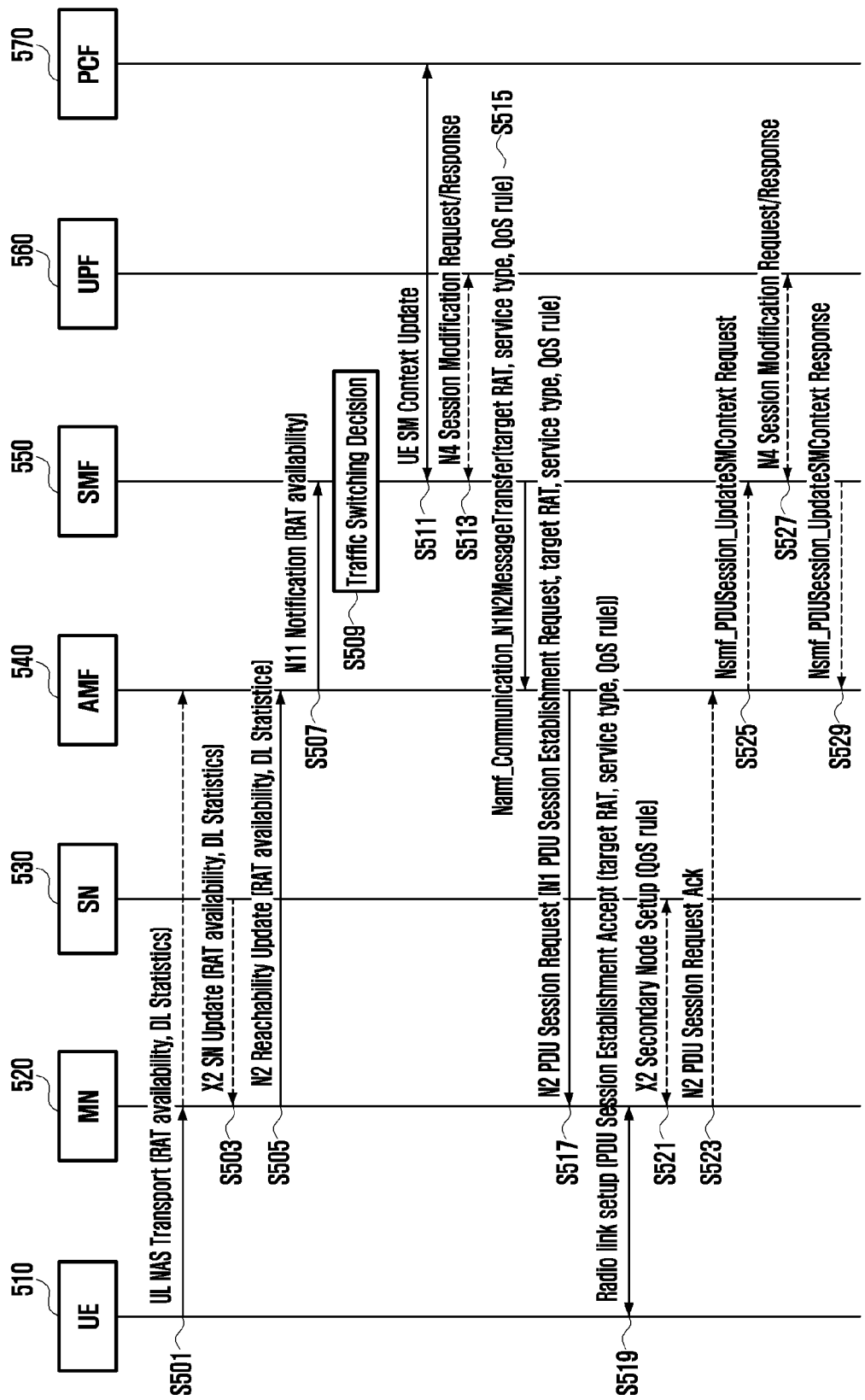
FIG. 5 is sequence diagram illustrating an operation method of, when available access information is changed while the UE uses access designated by the network, reporting changed state information to the network through the AMF and performing control to reconfigure access to be used by the UE on the basis of the state information transmitted from the SMF through the AMF according to another embodiment of FIG. 4.

FIG. 5 is sequence diagram illustrating an operation method of, when available access information is changed while the UE uses access designated by the network, reporting changed state information to the network through the AMF and performing control to reconfigure access to be used by the UE on the basis of the state information transmitted from the SMF through the AMF according to another embodiment of FIG. 4.

Referring to FIG. 5, a UE S10 may transmit a UL NAS message to an AMF 540 through an MN 520 in S501. At this time, the UE S10 may insert accesses to which the UE S10 is currently connected into the UL NAS message as a RAT availability parameter. Further, the UE S10 may insert DL statistics into the UL NAS message.

An SN 530 may transmit an X2 SN update including the RAT availability parameter and DL statistics to the MN 520 in S503. The MN 520 may transmit an N2 reachability update including the RAT availability parameter and DL statistics to the AMF 540 in S505. Thereafter, when the AMF 540 transmits N11 notification including RAT availability to the SMF 550 in S507, the SMF 550 may determine traffic switching in S509. The following operations (S511 to S529) are the same as the operations described with reference to FIGS. 3 and 4, and thus a description thereof will be omitted.

Figure 6:
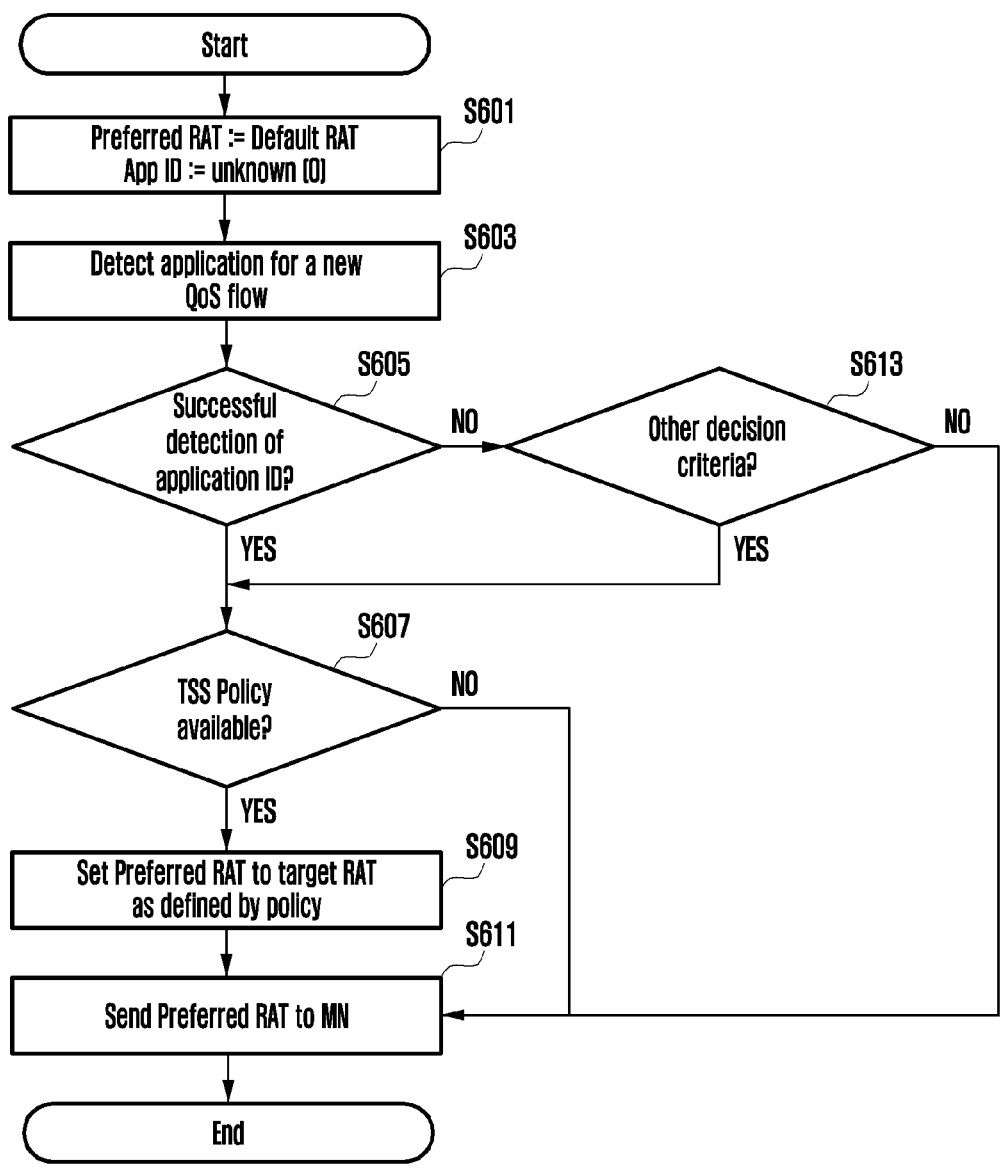
FIG. 6 is a flowchart illustrating a method by which the UE configures a RAT according to an embodiment.

FIG. 6 is a flowchart illustrating a method by which the UE configures a RAT according to an embodiment. In S601, the UE may configure a preferred RAT by default and configure an app ID as unknown (0). In S603 and S605, when an application for a new QoS flow is detected, the UE may determine whether detection of the application ID is successful.

When the detection of the application ID is successful, the UE may determine whether a TSS policy is possible in S607. Further, even when detection of the application ID is not successful, the UE may determine whether use of the TSS policy is possible in S607 when the UE has another decision criterion in S611.

When the TSS policy can be used, the UE may configure the preferred RAT as a target RAT according to a preset policy in S609.

In S611, the UE may transmit the preferred RAT to a master node (MN).

Figure 7:
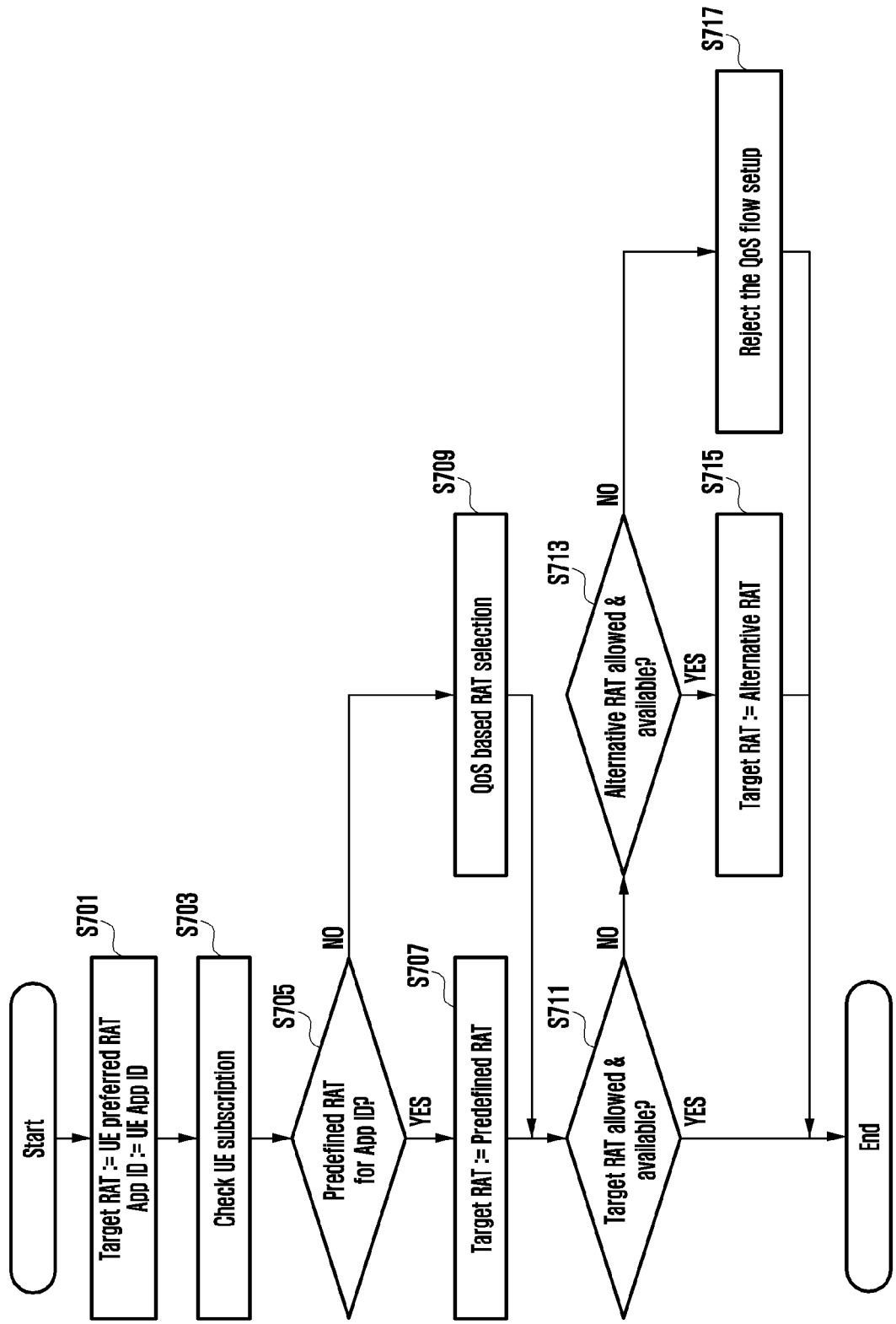
FIG. 7 is a flowchart illustrating a method by which the UE configures a RAT according to another embodiment.

FIG. 7 is a flowchart illustrating a method by which the UE configures a RAT according to another embodiment. When a target RAT is a preferred RAT and an App ID is a UE App ID in S701, the UE may identify UE subscription in S703.

In S705, the UE may determine whether there is a preset RAT for the App ID. When there is a preset RAT for the APP ID, the target RAT may be the preset RAT in S707. When there is no preset RAT for the App ID, the UE may select a QoS-based RAT in S709.

The UE may determine whether the target RAT is allowed and available in S711 and when it is determined that the target RAT is not allowed or not available on the basis of the determination result, may determine whether an alternative RAT is allowed and available in S713. When the alternative RAT is found to be allowed and available on the basis of the determination result, the target RAT may be the alternative RAT in S713. On the other hand, when the alternative RAT is not allowed or not available on the basis of the determination result, a QoS flow setup may be rejected in S717.

Figure 8:
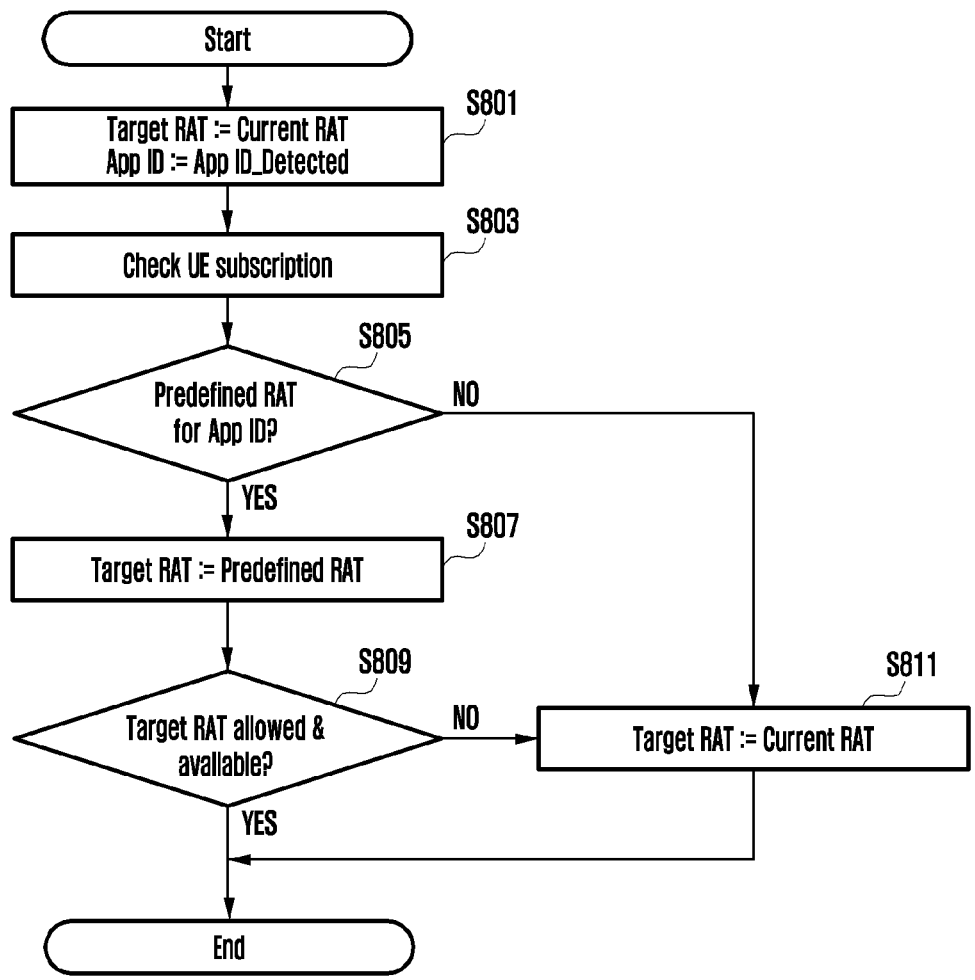
FIG. 8 is a flowchart illustrating a method by which the UE configures a RAT according to another embodiment.

FIG. 8 is a flowchart illustrating a method by which the UE configures a RAT according to another embodiment. When a target RAT is a current RAT and an App ID is a detected App ID (App ID_Detected) in S801, the UE may identify UE subscription in S803.

In S805, the UE may determine whether there is a preset RAT for the App ID. When there is a preset RAT for the APP ID, the target RAT may be the preset RAT in S807. In S809, the UE may determine whether the target RAT is allowed and available. When the target RAT is not allowed or not available on the basis of the determination result or when there is no preset RAT for the App ID, the target RAT may be determined as the current RAT in S811.

Figure 9:
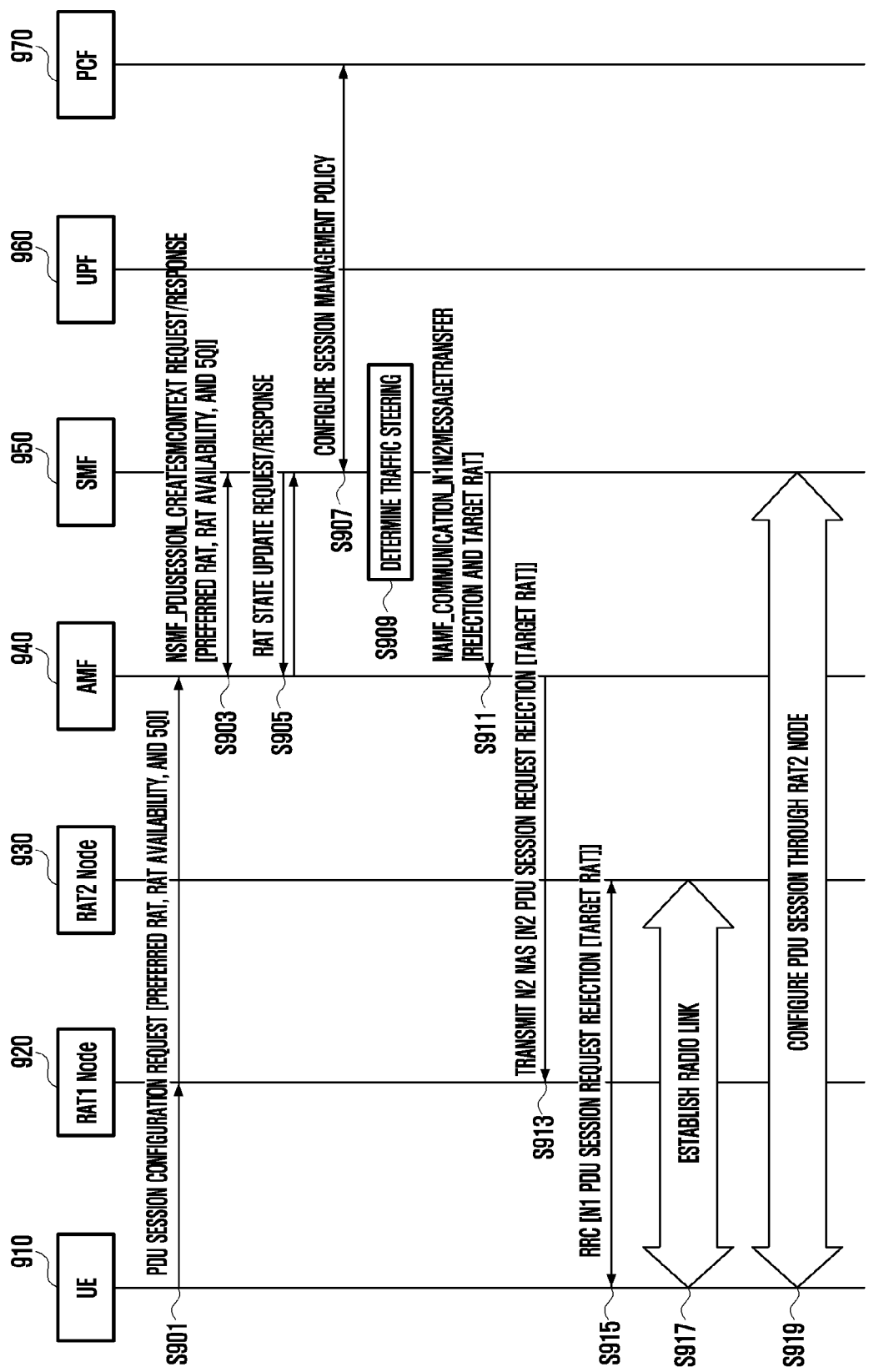
FIG. 9 is a flowchart illustrating a method by which the UE configures a RAT according to another embodiment.

FIG. 9 is a flowchart illustrating a method by which the UE configures a RAT according to another embodiment.

Referring to FIG. 9, a RAN2 node 930 may be an NR BS when a RAN1 node 920 is an LTE BS, and inversely the RAN2 node 930 may be an LTE BS when the RAN1 node 920 is the NR BS. That is, the RAN1 node 920 and the RAN2 node 930 may be nodes having different types of radio access technology (RAT).

In S901, the UE 910 may transmit a PDU session establishment request [including at least one of a preferred RAT, RAT availability, and 5QI] to an AMF 940 via the RAN1 node 920.

In S903, the AMF 940 may transmit and receive a Nsmf_PDUSession_CreateSMContext request/response [including at least one of a preferred RAT, RAT availability, and 5QI] to and from the SMF 950.

In S905, the AMF 940 may transmit and receive a RAT state update request/response to and from the SMF 950.

In S907, the SMF 950 may transmit and receive a session management policy establishment to and from a PCF 970.

The SMF 950 may determine traffic steering in S909 and transmit Namf_Communication_N1N2MessageTransfer [including at least one of rejection and a target RAT] to the AMF 940 in S911.

The AMF 940 may transmit N2 NAS [including N2 PDU session request rejection [target RAT]] to the RAN1 node 920 in S913, and the UE 910 and the RAN2 node 930 may transmit and receive an RRC message [including N1 PDU session request rejection [target RAT]] in S915.

The UE 910 and the RAN2 node 930 may perform a radio link setup in S917, and the UE 910 and the SMF 950 may establish a PDU session through the RAT2 node in S919.

Figure 10:
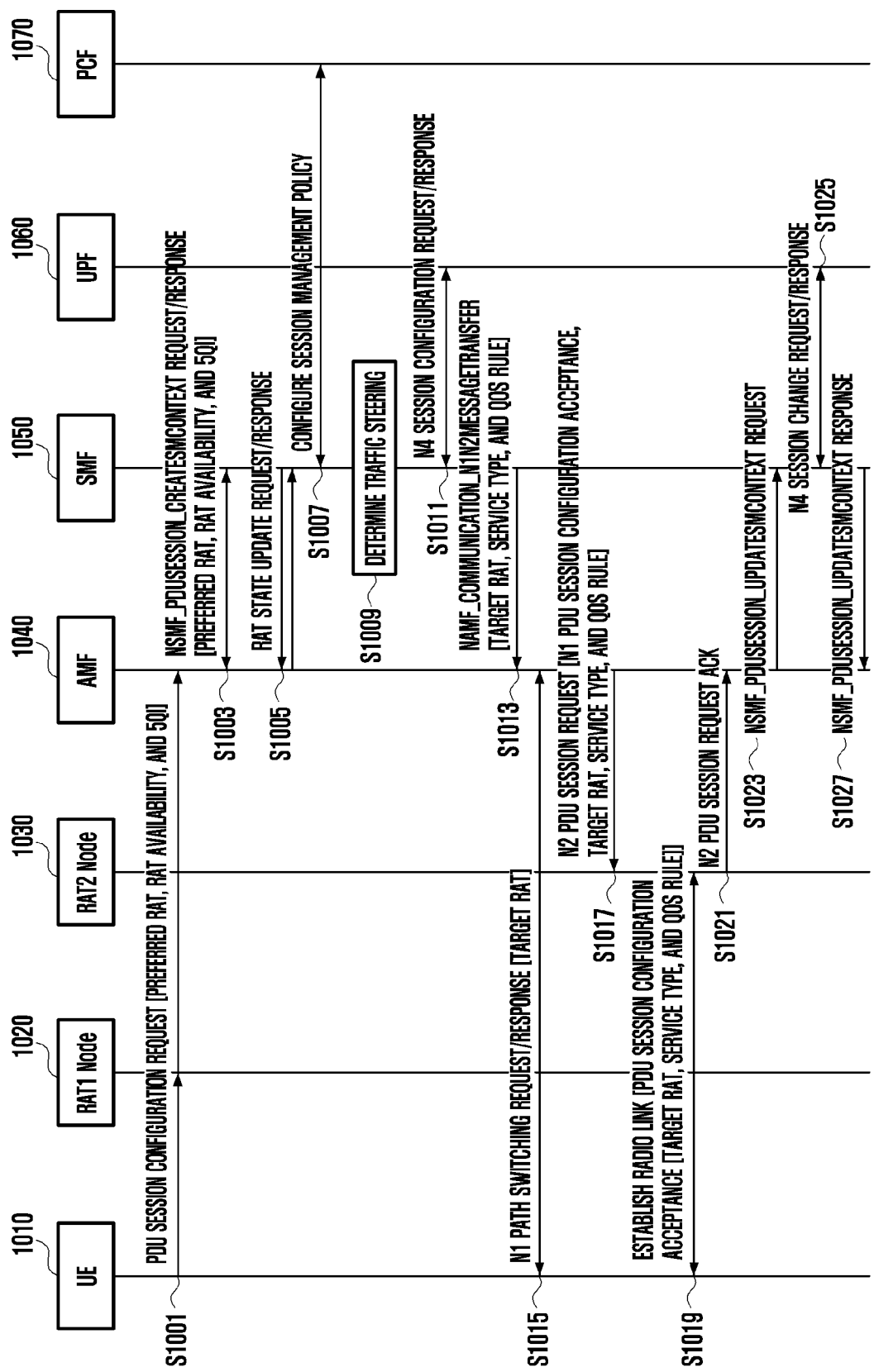
FIG. 10 is a flowchart illustrating a method by which the UE configures a RAT according to another embodiment.

FIG. 10 is a flowchart illustrating a method by which the UE configures a RAT according to another embodiment.

Referring to FIG. 10, a RAN2 node 1030 may be an NR BS when a RAN1 node 1020 is an LTE BS, and conversely, the RAN2 node 1030 may be the LTE BS when the RAN1 node 1020 is the NR BS. That is, the RAN1 node 1020 and the RAN2 node 1030 may be nodes having different radio access technologies (RATs).

In S1001, the UE 1010 may transmit a PDU session establishment request [including at least one of a preferred RAT, RAT availability, and 5QI] to an AMF 1040 via the RAN1 node 1020.

In S1003, the AMF 1040 may transmit and receive a Nsmf_PDUSession_CreateSMContext request/response [including at least one of a preferred RAT, RAT availability, and 5QI] to and from the SMF 1050.

In S1005, the AMF 1040 may transmit and receive a RAT state update request/response to and from the SMF 1050.

The SMF 1050 may transmit and receive a session management policy establishment to and from a PCF 1070 in S1007 and determine traffic steering in S1009.

The SMF 1050 may transmit and receive an N4 session establishment request/response to and from a UPF 1060 in S1011, and may transmit Namf_Communication_N1N2MessageTransfer [including at least one of a target RAT, a service type, and a QoS rule] to the AMF 1040 in S1013.

The AMF 1040 may transmit and receive an N1 path switching request/response [including a target RAT] to and from the UE 1010 in S1015 and transmit an N2 PDU session request [including at least one of an N1 PDU session establishment accept, a target RAT, a service type, and a QoS rule] to the RAN2 node 1030 in S1017.

In S1019, the RAN2 node 1030 may transmit and receive a radio link setup [PDU session establishment accept [including at least one of a target RAT, a service type, and a QoS rule]] to and from the UE 1010.

The RAN2 node 1030 may transmit N2 PDU session request Ack to the AMF 1040 in S1021, and the AMF 1040 may transmit a Nsmf_PDUSession_UpdateSMContext request to the SMF 1050 in S1023.

The SMF 1050 may transmit and receive an N4 session modification request/response to and from the UPF 1060 in S1025 and transmit a Nsmf_PDUSession_UpdateSMContext response to the AMF 1040 in S1027.

Figure 11:
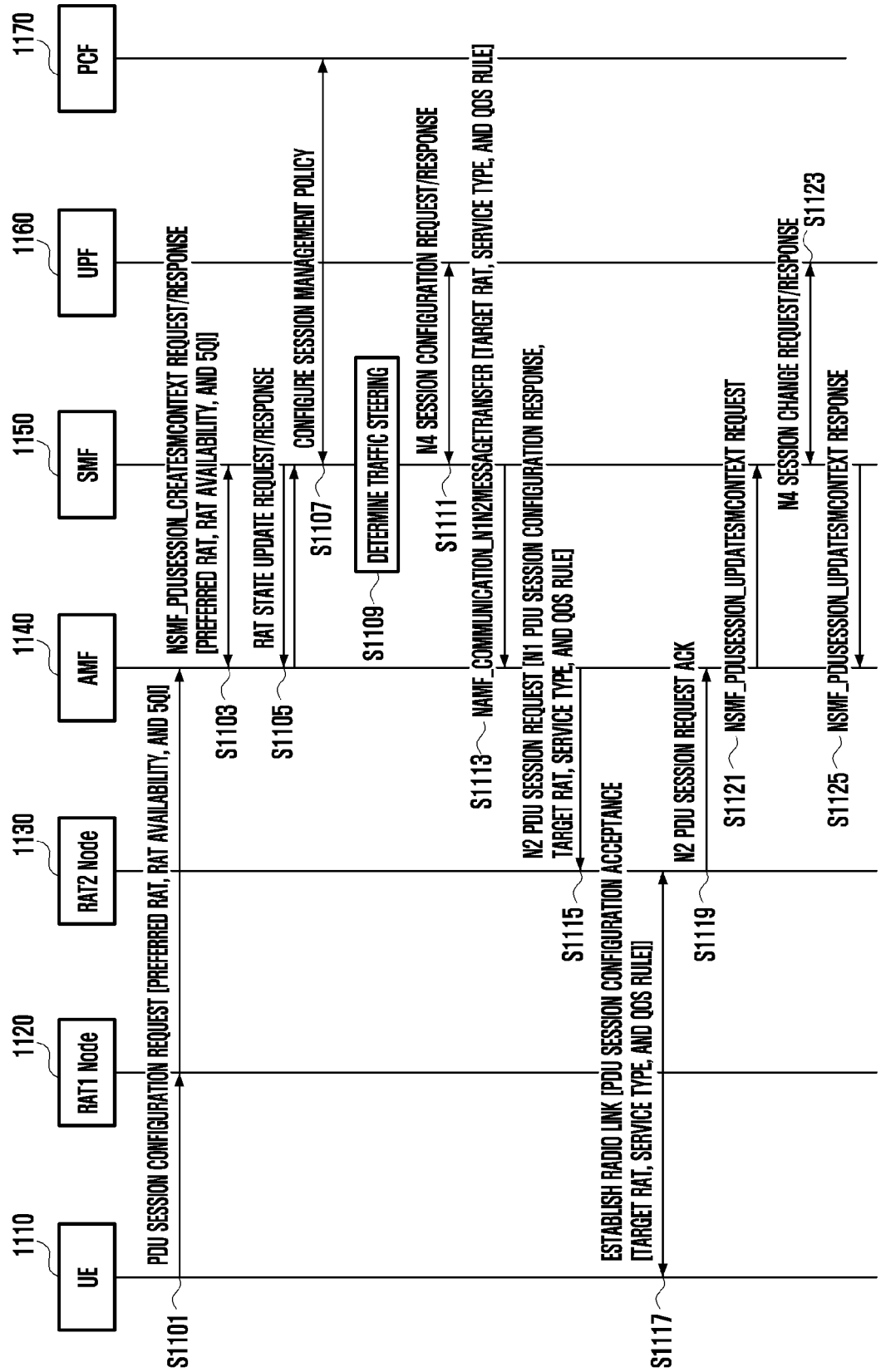
FIG. 11 is a flowchart illustrating a method by which the UE configures a RAT according to another embodiment.

FIG. 11 is a flowchart illustrating a method by which the UE configures a RAT according to another embodiment.

Referring to FIG. 11, a RAN2 node 1120 may be an NR BS when a RAN1 node 1130 is an LTE BS, and conversely, the RAN2 node 1120 may be the LTE BS when the RAN1 node 1130 is the NR BS. That is, the RAN1 node 1120 and the RAN2 node 1130 may be nodes having different radio access technologies (RATs).

In S1101, the UE 1110 may transmit a PDU session establishment request [including at least one of a preferred RAT, RAT availability, and 5QI] to an AMF 1140 via the RAN1 node 1120.

In S1103, the AMF 1140 may transmit and receive a Nsmf_PDUSession_CreateSMContext request/response [including at least one of a preferred RAT, RAT availability, and 5QI] to and from the SMF 1150.

The AMF 1140 may transmit and receive a RAT state update request/response to and from the SMF 1150 in S1105, and the SMF 1150 may transmit and receive a session management policy establishment to and from the PCF 1170 in S1107.

The SMF 1150 may determine traffic steering in S1109 and transmit and receive an N4 session establishment request/response to and from the UPF 1160 in S1111.

In S1113, the SMF 1150 may transmit Namf_Communication_N1N2MessageTransfer [including at least one of a target RAT, a service type, and a QoS rule] to the AMF 1140.

The AMF 1140 may transmit an N2 PDU session request [including at least one of an N1 PDU session establishment response, a target RAT, a service type, and a QoS rule] to the RAN2 node 1130 in S1115, and the RAN2 node 1130 may transmit and receive a radio link setup [PDU session establishment accept [including at least one of a target RAT, a service type, and a QoS rule]] to and from the UE 1110 in S1117.

In S1121, the RAN2 node 1130 may transmit an N2 PDU session request Ack to the AMF 1140.

The AMF 1140 may transmit a Nsmf_PDUSession_UpdateSMContext request to the SMF 1150 in S1123, and the SMF 1150 may transmit and receive an N4 session modification request/response to and from the UPF 1160 in S1125.

In S1127, the SMF 1150 may transmit a Nsmf_PDUSession_UpdateSMContext response to the AMF 1140.

Figure 12:
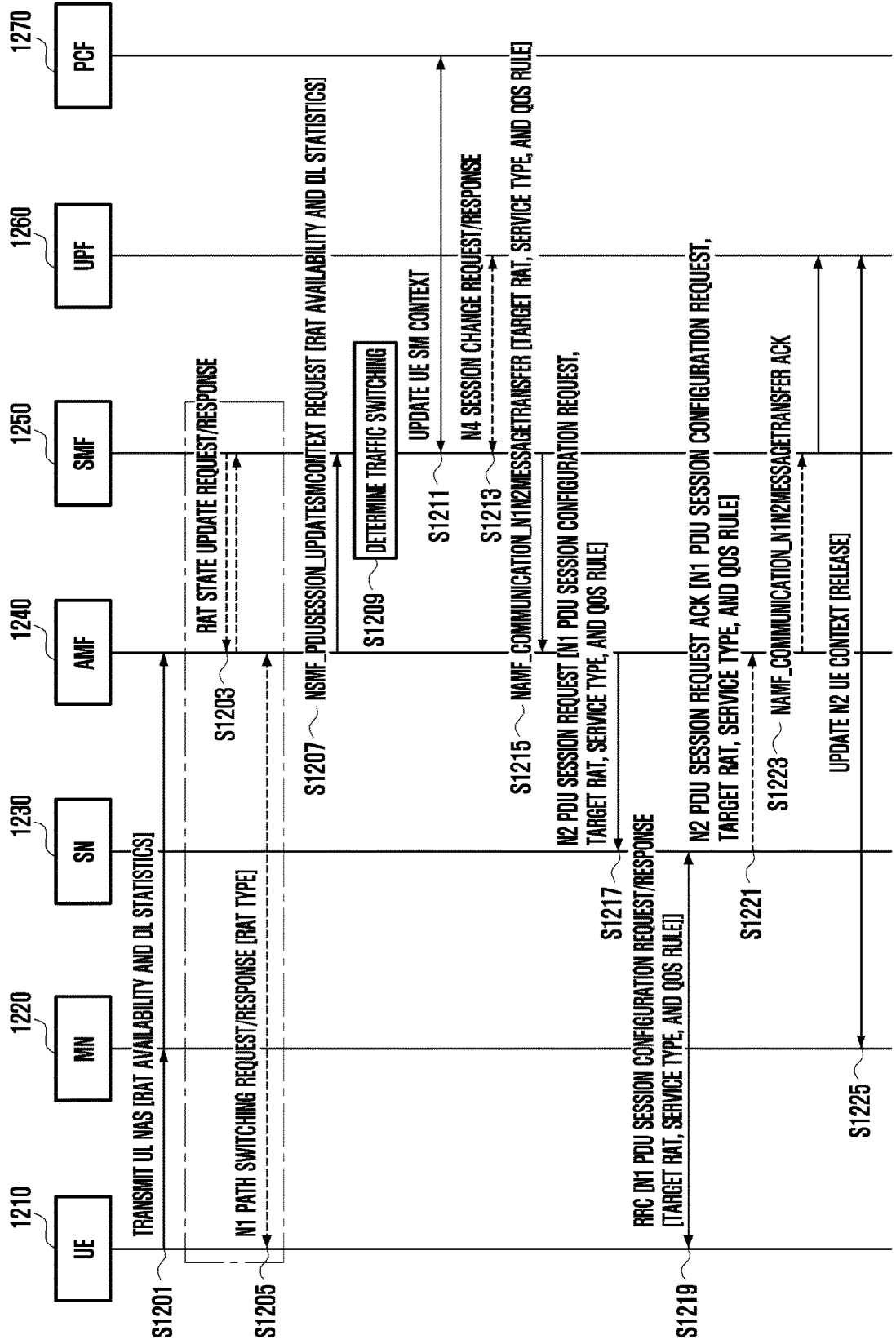
FIG. 12 is a flowchart illustrating a method by which the UE configures a RAT according to another embodiment.

FIG. 12 is a flowchart illustrating a method by which the UE configures a RAT according to another embodiment.

In S1201, the UE 1210 may transmit a UL NAS [including at least one of RAT availability and DL statistics] to an AMF 1240 via the RAN1 node 1220.

The AMF 1240 may transmit and receive a RAT state update request/response to and from the SMF 1250 in S1203 and transmit and receive an N1 path switching request/response [including a RAT type] to and from the UE 1210 in S1205.

In S1207, the AMF 1240 may transmit a Nsmf_PDUSession_UpdateSMContext request [including at least one of RAT availability and DL statistics] to the SMF 1250.

The SMF 1250 may determine traffic switching in S1209 and transmit and receive a UE SM context update to and from the PCF 1270 in S1211.

The SMF 1250 may transmit and receive an N4 session modification request/response to and from the UPF 1260 in S1213 and transmit Namf_Communication_N1N2MessageTransfer [including at least one of a target RAT, a service type, and a QoS rule] to the AMF 1240 in S1215.

The AMF 1240 may transmit an N2 PDU session request [including at least one of an N1 PDU session establishment request, a target RAT, a service type, and a QoS rule] to the RAN2 node 1230 in S1217, and the RAN2 node 1230 may transmit and receive RRC [N1 PDU session establishment request/response [including at least one of a target RAT, a service type, and a QoS rule]] to and from the UE 1210 in S1219.

In S1221, the RAN2 node 1230 may transmit an N2 PDU session request Ack [including at least one of an N1 PDU session establishment request, a target RAT, a service type, and a QoS rule] to the AMF 1240.

In S1223, the AMF 1240 may transmit a Namf_Communication_N1N2MessageTransfer Ack to the UPF 1260 via the SMF 1250.

In S1225, the RAN1 node 1220 may perform an N2 UE context update procedure (release) with the UPF 1260.

Figure 13:
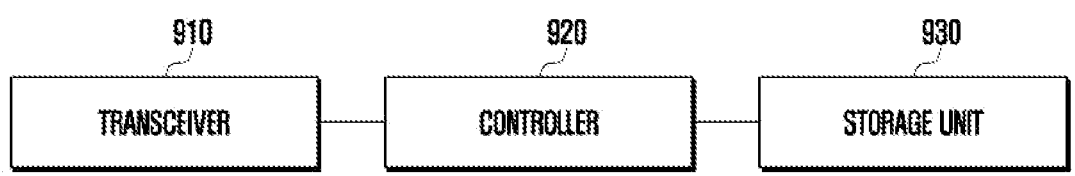
FIG. 13 is a block diagram illustrating a UE according to an embodiment.

FIG. 13 illustrates the structure of a UE according to embodiments.

The UE illustrated in FIG. 13 may be the UE illustrated in FIGS. 1 to 12. Referring to FIG. 13, the UE may include a transceiver 1310, a controller 1320, and a storage unit 1330. In the disclosure, the controller 1320 may be defined as a circuit, an application-specific integrated circuit, or at least one processor.

The transceiver 1310 may transmit and receive a signal to and from another network entity (a master node, a secondary node, or an entity within a 5G core network). The transceiver 1310 may transmit, for example, a session establishment and modification request.

The controller 1320 may control the overall operation of the UE according to an embodiment proposed by the disclosure. The controller 1320 may control signal flow between blocks to perform operation according to the flowchart. For example, the controller 1320 may perform control to make a request for a session through a currently designated MN and allow the UE to receive a transmission path to be finally used from the network in response to the corresponding request, according to an embodiment.

Meanwhile, the storage unit 1330 may store at least one piece of information transmitted and received through the transceiver 1310 and information generated through the controller 1320.

Figure 14:
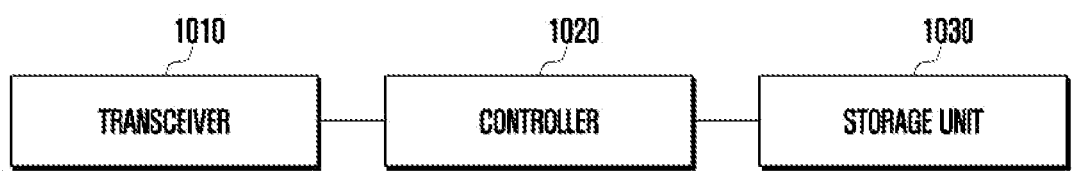
FIG. 14 is a block diagram illustrating network entities according to embodiments.

FIG. 14 is a block diagram illustrating network entities according to embodiments.

The network entity illustrated in FIG. 14 may be one of the master node (MN), the secondary node (SN), the user plane function (UPF), the access and mobility function (AMF), the session management function (SMF), the user data management (UDM), and the policy control function (PCF) illustrated in FIGS. 1 to 5 and FIGS. 9 to 12.

Referring to FIG. 14, the network entities may include a transceiver 1410, a controller 1420, and a storage unit 1430. In the disclosure, the controller 1420 may be defined as a circuit, an application-specific integrated circuit, or at least one processor.

The transceiver 1410 may transmit and receive signals to and from the UE or another network entity.

The controller 1420 may control the overall operation of the network entities according to an embodiment proposed by the disclosure. The controller 1420 may control signal flow between blocks to perform the operations according to the flowchart.

Meanwhile, the storage unit 1430 may store at least one piece of information transmitted and received through the transceiver 1410 and information generated through the controller 1420.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of establishing a connection by a terminal in a wireless communication system, the method comprising:
   transmitting a session establishment request message including first access information preferred for an application executed by the terminal and available access information of the terminal;
   receiving a session establishment accept message including second access information for data transmission of the application determined by a session management function (SMF); and
   setting a radio link with a base station based on the second access information,
   wherein the second access information is based on subscriber information of the terminal provided from a policy control function (PCF), the first access information, and the available access information.

2. The method of claim 1, wherein the session establishment request message further includes at least one piece of information related to a quality of service (QoS) requested by the terminal and identifier information of the application.

3. The method of claim 1, wherein the session establishment accept message further includes quality of service (QoS) rule information indicating a QoS parameter for the data transmission of the application.

4. The method of claim 1, further comprising:
in case that the available access information is changed, transmitting a first message including the changed available access information;
in case that traffic switching is determined in the SMF based on the changed available access information, receiving a second message including third access information for data transmission of the application determined by the SMF; and
setting a radio link with the base station based on the third access information.

5. A method of establishing a connection by a session management function (SMF) in a wireless communication system, the method comprising:
receiving a session establishment request message including first access information preferred for an application executed by a terminal and available access information of the terminal;
determining second access information for data transmission of the application based on subscriber information of the terminal received from a policy control function (PCF), the first access information, and the available access information; and
transmitting a session establishment accept message including the second access information.

6. The method of claim 5, wherein the session establishment request message further includes at least one piece of information related to a quality of service (QoS) requested by the terminal and identifier information of the application.

7. The method of claim 5, wherein the session establishment accept message further includes quality of service (QoS) rule information indicating a QoS parameter for the data transmission of the application.

8. The method of claim 5, further comprising:
in case that the available access information is changed, receiving a first message including the changed available access information;
in case that traffic switching is determined based on the changed available access information, determining third access information for data transmission of the application; and
transmitting a second message including the third access information.

9. A terminal establishing a connection in a wireless communication system, the terminal comprising:
a transceiver; and
a controller configured to;
transmit, via the transceiver, a session establishment request message including first access information preferred for an application executed by the terminal and available access information of the terminal,
receive, via the transceiver, a session establishment accept message including second access information for data transmission of the application determined by a session management function (SMF), and
set a radio link with a base station based on the second access information,
wherein the second access information is based on subscriber information of the terminal provided from a policy control function (PCF), the first access information, and the available access information.

10. The terminal of claim 9, wherein the session establishment request message further includes at least one piece of information related to a quality of service (QoS) requested by the terminal and identifier information of the application.

11. The terminal of claim 9, wherein the session establishment accept message further includes quality of service (QoS) rule information indicating a QoS parameter for the data transmission of the application.

12. The terminal of claim 9, wherein the controller is configured to;
in case that the available access information is changed, transmit, via the transceiver, a first message including the changed available access information,
in case that traffic switching is determined in the SMF based on the changed available access information, receive, via the transceiver, a second message including third access information for data transmission of the application determined by the SMF, and
set a radio link with the base station based on the third access information.

13. A session management function (SMF) establishing a connection in a wireless communication system, the SMF comprising:
a transceiver; and
a controller configured to;
receive, via the transceiver, a session establishment request message including first access information preferred for an application executed by a terminal and available access information of the terminal,
determine second access information for data transmission of the application based on subscriber information of the terminal received from a policy control function (PCF), the first access information, and the available access information, and
transmit, via the transceiver, a session establishment accept message including the second access information.

14. The SMF of claim 13, wherein the session establishment request message further includes at least one piece of information related to a quality of service (QoS) requested by the terminal and identifier information of the application.

15. The SMF of claim 13, wherein the controller is configured to;
in case that the available access information is changed, receive, via the transceiver, a first message including the changed available access information,
in case that traffic switching is determined based on the changed available access information, determine third access information for data transmission of the application, and
transmit a second message including the third access information.

* * * * *